United States Patent
Griffiths et al.

(10) Patent No.: US 12,058,188 B2
(45) Date of Patent: Aug. 6, 2024

(54) METHOD FOR PROVIDING MULTICAST DNS SERVICES ACROSS IP SUBNET BOUNDARIES USING TCP PROXY OR SOURCE AND DESTINATION NETWORK ADDRESS TRANSLATION

(71) Applicant: ARRIS Enterprises LLC, Suwanee, GA (US)

(72) Inventors: Mark Stephen Griffiths, Manhattan Beach, CA (US); Matthew Stephen Frick, Martinez, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/308,509

(22) Filed: May 5, 2021

(65) Prior Publication Data
US 2021/0409468 A1    Dec. 30, 2021

Related U.S. Application Data

(60) Provisional application No. 63/046,049, filed on Jun. 30, 2020.

(51) Int. Cl.
| | |
|---|---|
| *H04L 65/611* | (2022.01) |
| *H04L 61/251* | (2022.01) |
| *H04L 61/4511* | (2022.01) |
| *H04L 65/102* | (2022.01) |
| *H04L 101/663* | (2022.01) |

(52) U.S. Cl.
CPC .......... *H04L 65/611* (2022.05); *H04L 61/251* (2013.01); *H04L 61/4511* (2022.05); *H04L 65/102* (2013.01); *H04L 2101/663* (2022.05)

(58) Field of Classification Search
None
See application file for complete search history.

(56) References Cited

U.S. PATENT DOCUMENTS

| | | | | |
|---|---|---|---|---|
| 9,479,422 | B2 * | 10/2016 | Sundaresan | ......... H04L 61/4511 |
| 10,498,864 | B1 * | 12/2019 | Farrugia | ................. H04L 12/66 |

(Continued)

FOREIGN PATENT DOCUMENTS

DE    10 2007 029 626    1/2009

OTHER PUBLICATIONS

International Search Report issued Jun. 30, 2021 in International (PCT) Application No. PCT/US2021/030858.

(Continued)

*Primary Examiner* — Younes Naji
(74) *Attorney, Agent, or Firm* — Wenderoth, Lind & Ponack, L.L.P.

(57) ABSTRACT

A network address translation (NAT) gateway intercepts packets and determines whether they contain multicast domain name server (mDNS) query or response messages. Upon receiving an mDNS message, the NAT gateway performs address translation to assign a new source address and stores the original source address in a translation table. The NAT gateway then forwards the message to all adjacent networks in order to expand the reach of the packet. If the mDNS messages establish a new client-server connection, the NAT gateway brokers the connection by either acting as a proxy or continuing to perform network address translation.

21 Claims, 9 Drawing Sheets

(56) References Cited

U.S. PATENT DOCUMENTS

| | | | |
|---|---|---|---|
| 10,715,482 B2* | 7/2020 | Rahman | H04L 67/51 |
| 11,412,442 B2* | 8/2022 | M M | H04L 67/51 |
| 2014/0012967 A1* | 1/2014 | Agarwal | H04L 61/4511 |
| | | | 709/223 |
| 2016/0006822 A1* | 1/2016 | Kloberdans | H04L 63/0272 |
| | | | 709/204 |
| 2019/0182060 A1* | 6/2019 | Simotas | H04L 61/4541 |

OTHER PUBLICATIONS

S. Bhandari et al., "Extending multicast DNS across local links in Campus and Enterprise networks: draft-bhandari-dnssd-mdns-gateway-00.txt", Internet Engineering Task Force (IETF), Internet Society (ISOC) 4, Oct. 21, 2013, pp. 1-13, XP015095533.
International Preliminary Report on Patentability dated Dec. 13, 2022 in International (PCT) Application No. PCT/US2021/030858.

\* cited by examiner

| | NAT-Enabled Side | mDNS Side |
|---|---|---|
| Local IP | 192.168.1.10 | 192.168.0.30 |
| Remote IP | 192.168.1.254 | 192.168.0.20 |
| Local Port | 631 (IPP) | Chosen by client |
| Remote Port | Chosen by client | 631 (IPP) |

FIG. 4A

METHOD FOR PROVIDING MULTICAST DNS SERVICES ACROSS IP SUBNET BOUNDARIES USING TCP PROXY OR SOURCE AND DESTINATION NETWORK ADDRESS TRANSLATION

BACKGROUND

The present disclosure relates generally to systems and methods for multicast networking across IP subnets, and more specifically to systems and methods for providing multicast DNS services across IP subnet boundaries using TCP proxy or source and destination network address translation (NAT).

SUMMARY OF THE INVENTION

Aspects of the present disclosure are drawn to a gateway device for use with a multicast domain name system (mDNS) client on a first sub-network and an mDNS server on a second sub-network. The gateway device is configured to facilitate communication between the mDNS client and the mDNS server. The gateway device including a memory and a processor configured to execute instructions stored on the memory to cause the gateway device to: receive an mDNS query from the mDNS client, the mDNS query including a first internet protocol version 4 or version 6 (IP) address associated with the mDNS client and a payload; substitute, in the mDNS query, the first IP address with a second IP address associated with the gateway device to generate a modified mDNS query including the second IP address and the payload; and relay the modified mDNS query to the sub-network upon which the mDNS server resides.

In some embodiments, the processor is further configured to cause the gateway device to: receive an mDNS response from the mDNS server, in response to the modified mDNS query and addressed to the second IP address associated with the gateway, the mDNS response including a third IP address associated with the mDNS server; substitute, in the mDNS response, the third IP address with a fourth IP address associated with the gateway device to generate a modified mDNS response including the fourth IP address; and relay the modified mDNS response to the mDNS client. In some of these embodiments, the processor is further configured to execute instructions stored on the memory to cause the gateway device to maintain a data structure that maps the first IP address with the second IP address, that maps the third IP address with the fourth IP address and that maps ports associated with the first sub-network with ports associated with the second sub-network so as to enable a subsequent transmission control protocol (TCP) session between the mDNS client and the mDNS server. In other of these embodiments, the processor is further configured to execute instructions stored on the memory to cause the gateway device to: accept a first transmission control protocol (TCP) connection from the mDNS client; initiate a second TCP connection with the mDNS server; and pass TCP data between the mDNS client to the mDNS server.

In some embodiments, the processor is further configured to cause the gateway device to: receive a second mDNS response from a second mDNS server, in response to the modified mDNS query and addressed to the second IP address associated with the gateway, the second mDNS response including a fifth IP address associated with the second mDNS server; substitute, in the second mDNS response, the fifth IP address with a sixth IP address associated with the gateway device to generate a second modified mDNS response including the sixth IP address; and relay the second modified mDNS response to the mDNS client. In some of these embodiments, the second IP address and sixth IP address are selected from one or more available IP addresses that are reserved exclusively for mDNS communication.

In some embodiments, the mDNS query contains information indicating that it is an mDNS query. In some of these embodiments, the information is a TCP and/or UDP port number.

In some embodiments, the processor is further configured to cause the gateway device to: receive a second mDNS response from a second mDNS server, in response to the modified mDNS query and addressed to the second IP address associated with the gateway, the second mDNS response including a fifth IP address associated with the second mDNS server; substitute, in the second mDNS response, the fifth IP address with a sixth IP address associated with the gateway device to generate a second modified mDNS response including the sixth IP address; and relay the second modified mDNS response to the mDNS client. In some of these embodiments, the second IP address and sixth IP address are selected from one or more available IP addresses that are reserved exclusively for mDNS communication.

In some embodiments, the mDNS query contains information indicating that it is an mDNS query. In some of these embodiments, the information is a TCP and/or UDP port number.

Other aspects of the present disclosure are drawn to a method of operating a gateway device for use with a multicast domain name system (mDNS) client on a first sub-network and an mDNS server on a second sub-network. The gateway device is configured to facilitate communication between the mDNS client and the mDNS server. The method includes: receiving, via a processor configured to execute instructions stored on a memory, an mDNS query from the mDNS client, the mDNS query including a first internet protocol (IP) address associated with the mDNS client and a payload; substituting, via the processor and in the mDNS query, the first IP address with a second IP address associated with the gateway device to generate a modified mDNS query including the second IP address and the payload; and relaying, via the processor, the modified mDNS query to the mDNS server.

In some embodiments, the method further includes: receiving, via the processor, an mDNS response from the mDNS server, in response to the modified mDNS query and addressed to the mDNS client, the mDNS response including a third IP address associated with the mDNS server; substituting, via the processor and in the mDNS response, the third IP address with a fourth IP address associated with the gateway device to generate a modified mDNS response including the fourth IP address; and relaying, via the processor, the modified mDNS response to the mDNS client. In some of these embodiments, the method further includes maintaining, via the processor, a data structure that maps the first IP address with the second IP address, that maps the third IP address with the fourth IP address and that maps ports associated with the first sub-network with ports associated with the second sub-network so as to enable a transmission control protocol (TCP) session between the mDNS client and the mDNS server. In other of these embodiments, the method further includes: accepting, via the processor, a first transmission control protocol (TCP) connection from the mDNS client; initiating, via the processor, a second TCP connection with the mDNS server; and passing, via the processor, TCP data from the mDNS client to the mDNS server.

In some embodiments, the method further includes: receiving, via the processor, a second mDNS response from a second mDNS server, in response to the modified mDNS query and addressed to the second IP address associated with the gateway, the second mDNS response including a fifth IP address associated with the second mDNS server; substituting, via the processor, in the second mDNS response, the fifth IP address with a sixth IP address associated with the gateway device to generate a second modified mDNS response including the sixth IP address; and relaying, via the processor, the second modified mDNS response to the mDNS client. In some of these embodiments, the second IP address and sixth IP address are selected from one or more available IP addresses that are reserved exclusively for mDNS communication.

In some embodiments, the mDNS query contains information indicating that it is an mDNS query. In some of these embodiments, the information is a TCP and/or UDP port number.

Other aspects of the present disclosure are drawn to anon-transitory, computer-readable media having computer-readable instructions stored thereon, the computer-readable instructions being capable of being read by a gateway device for use with a multicast domain name system (mDNS) client on a first sub-network and an mDNS server on a second sub-network. The gateway device is configured to facilitate communication between the mDNS client and the mDNS server. The computer-readable instructions are capable of instructing the gateway device to perform the method including: receiving, via a processor configured to execute instructions stored on a memory, an mDNS query from the mDNS client, the mDNS query including a first internet protocol (IP) address associated with the mDNS client and a payload; substituting, via the processor and in the mDNS query, the first IP address with a second IP address associated with the gateway device to generate a modified mDNS query including the second IP address and the payload; and relaying, via the processor, the modified mDNS query to the mDNS server.

In some embodiments, the computer-readable instructions are capable of instructing the gateway device to perform the method further including: receiving, via the processor, an mDNS response from the mDNS server, in response to the modified mDNS query and addressed to the mDNS client, the mDNS response including a third IP address associated with the mDNS server; substituting, via the processor and in the mDNS response, the third IP address with a fourth IP address associated with the gateway device to generate a modified mDNS response including the fourth IP address; and relaying, via the processor, the modified mDNS response to the mDNS client. In some of these embodiments, the computer-readable instructions are capable of instructing the gateway device to perform the method further including maintaining, via the processor, a data structure that maps the first IP address with the second IP address, that maps the third IP address with the fourth IP address and that maps ports associated with the first sub-network with ports associated with the second sub-network so as to enable a transmission control protocol (TCP) session between the mDNS client and the mDNS server. In other of these embodiments, the computer-readable instructions are capable of instructing the gateway device to perform the method further including: accepting, via the processor, a first transmission control protocol (TCP) connection from the mDNS client; initiating, via the processor, a second TCP connection with the mDNS server; and passing, via the processor, TCP data from the mDNS client to the mDNS server In some embodiments, the computer-readable instructions are capable of instructing the gateway device to perform the method further including: receiving, via the processor, a second mDNS response from a second mDNS server, in response to the modified mDNS query and addressed to the second IP address associated with the gateway, the second mDNS response including a fifth IP address associated with the second mDNS server; substituting, via the processor, in the second mDNS response, the fifth IP address with a sixth IP address associated with the gateway device to generate a second modified mDNS response including the sixth IP address; and relaying, via the processor, the second modified mDNS response to the mDNS client. In some of these embodiments, the second IP address and sixth IP address are selected from one or more available IP addresses that are reserved exclusively for mDNS communication.

In some embodiments, the computer-readable instructions are capable of instructing the gateway device to perform the method wherein the mDNS query contains information indicating that it is an mDNS query. In some of these embodiments, the information is a TCP and/or UDP port number.

BRIEF DESCRIPTION OF THE DRAWINGS

The accompanying drawings, which are incorporated in and form a part of the specification, illustrate example embodiments and, together with the description, serve to explain the principles of the invention. In the drawings:

FIG. 4A shows a port mapping table in accordance with some embodiments of the invention;

DETAILED DESCRIPTION

In home IP networks it is common for one or more NAT-enabled residential gateways ("RGs") to connect to the LAN subnet provided by an internet service provider via a broadband RG or cable gateway. This may be to hide the home topology of the network from the service provider, or to add extra Wi-Fi coverage via a different subnet. It is also possible to configure multiple LAN-side IP subnets, to divide groups of devices into different LAN segments, to control the routing between them. A multicast DNS (mDNS) protocol is used to facilitate plug-and-play network printing from a client device to a mDNS-enabled printer. An mDNS reach is limited to the local network and does not traverse IPv4 subnets. Therefore, an mDNS-enabled printer on an IP subnet is not accessible to an mDNS client (for example a MAC® computer, iPhone® or iPad®) which is connected indirectly to the printer's IP subnet via a NAT-enabled RG. Conversely, a printer behind a NAT-enabled RG on an IP subnet is not accessible to an mDNS client, which is connected to the NAT-enabled RG's "WAN" interface. An algorithm to be executed by a processor described here, when implemented and activated on a RG, enables one or more mDNS clients to access one or more mDNS "service providers" (for example printers) across the intermediate RG's subnet without any modification to the mDNS protocol, or any reliance on a unicast-based DNS lookup mechanism.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although various embodiments may be described with respect to a system, a non-transitory computer-readable medium, and a method, it is contemplated that embodiments with identical or substantially similar features may alternatively be implemented as methods, systems, and/or non-transitory computer-readable media.

Figure 1A:
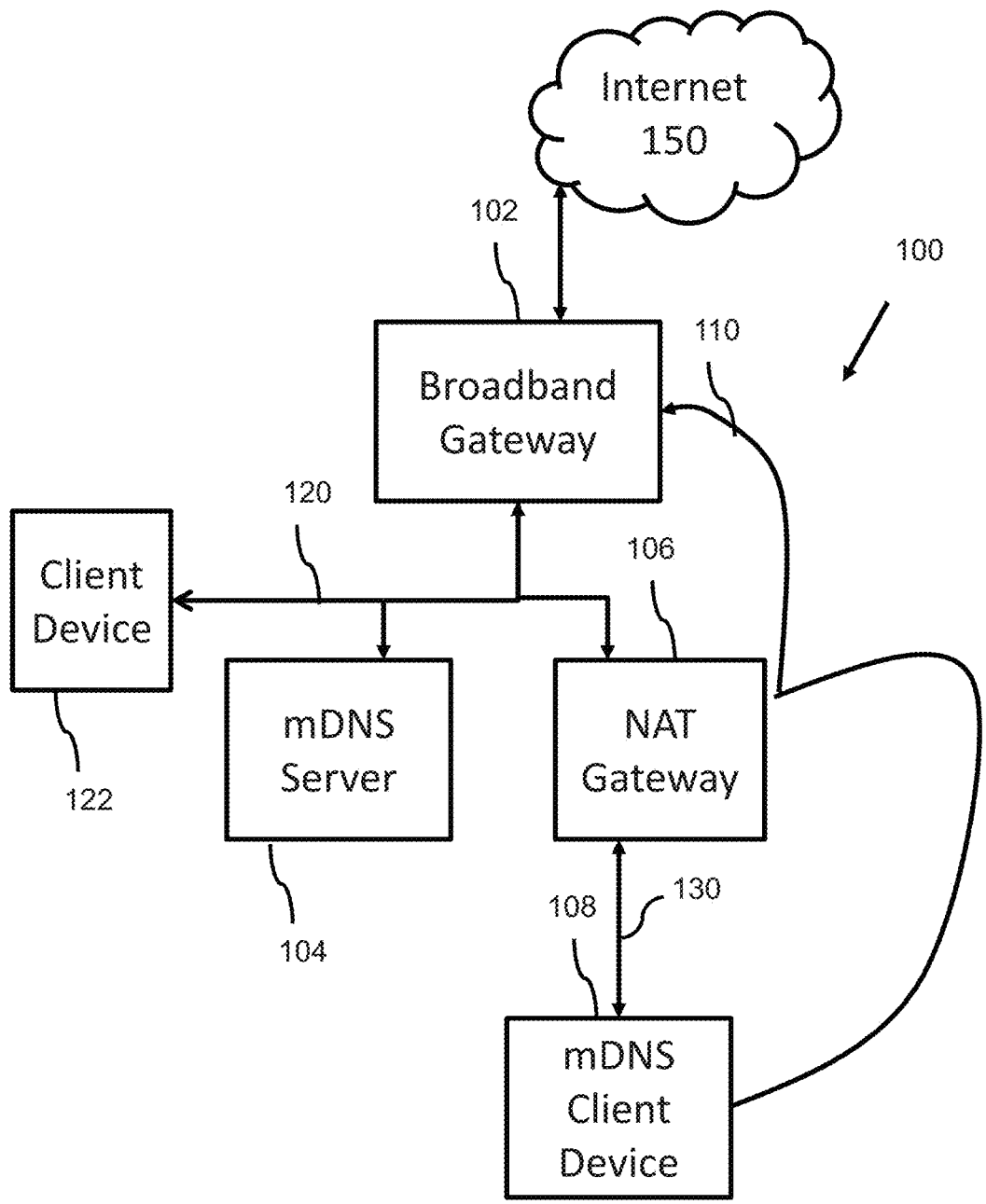
FIG. 1A shows a conventional home network.

FIG. 1A shows a conventional implementation of a home network 100. Home network 100 may include a broadband gateway 102, which provides a connection to Internet 150 and facilitates communication between devices on home network 100. Broadband gateway 102 may use any number of techniques to connect to Internet 150, including but not limited to: cable, fiber optic, cellular, digital subscriber line (DSL), satellite, and/or dial-up access over a public switched telephone network (PSTN). Additionally, broadband gateway 102 may be provided by a customer's internet service provider (ISP), or the customer may purchase their own broadband gateway 102 and configure it to operate on their ISP's network. Regardless of how broadband gateway 102 communicates with Internet 150, it will be appreciated that such a connection allows broadband gateway to provide devices on home network 100 with access to various services on Internet 150, such as multimedia streaming, web browsing, email, and file transfer.

In order to facilitate communication between devices on home network 100, broadband gateway 102 may provide a Local Area Network (LAN) 120. LAN 120 allows broadband gateway 102 to forward data from one device to another on home network 100, as well as to transfer data between Internet 150 and devices on home network 100. LAN 120 may be implemented via Ethernet, Token Ring, Wi-Fi, or any number of standards and protocols. According to one embodiment, LAN 120 is carried out according to the Institute of Electrical and Electronics Engineers (IEEE) 802.3 standard for Ethernet, which provides switching of layer 2 frames between devices on home network 100. In accordance with the Ethernet protocol, every device on home network 100 must have its own unique media access control (MAC) address. Further, the layer 2 frames on LAN 120 may encapsulate layer 3 Internet Protocol (IP) packets between devices on home network 100 and Internet 150, as will be discussed in further detail below.

Home network 100 may include a variety of devices, such as client device 122, mDNS server 104, mDNS client device 108, and NAT gateway 106. Client device 122 may be any generic networking device, such as a desktop workstation, laptop, and/or smartphone. mDNS server 104 may be a device offering services to other devices on home network 100. mDNS client device 108 may be a device wishing to consume services offered by mDNS server 104. Finally, NAT gateway 106 may provide a connection between LAN 120 and devices not directly connected to LAN 120, such as mDNS client device 108 on LAN 130. Connection 110 shows how NAT gateway 106 provides a relay for mDNS client device 108 on LAN 130 through LAN 120 to broadband gateway 102. Although not shown, there may be other devices besides mDNS client device 108 on LAN 130 that rely on NAT gateway 106 to connect to LAN 120.

As can be seen, devices on home network 100 within LAN 120 and LAN 130 are separated from one another by NAT gateway 106. Further, when devices on home network 100 are operating according to the layer 3 IPv4 protocol, then devices on LAN 120 and LAN 130 may also be assigned to different IP subnets. In one embodiment, devices on LAN 120 are assigned to the 192.168.0.0 subnet, and devices on LAN 130 are assigned to the 192.168.1.0 subnet. In accordance with this embodiment, addresses in home network 100 may be assigned as follows: broadband gateway 102 uses 192.168.0.1; mDNS server 104 uses 192.168.0.30; NAT gateway 106 uses 192.168.0.20 for the 192.168.0.0 subnet and 192.168.1.254 for the 192.168.1.1 subnet; client device 122 uses 192.168.0.40; and mDNS client device 108 uses 192.168.1.10. Devices within the 192.168.0.0 subnet may communicate with one another directly; however, in order for mDNS client device 108 to communicate with devices on the 192.168.0.0 subnet, NAT gateway 106 must perform network address translation. NAT gateway 106 performs network address translation for mDNS client device 108 when it wants to communicate with subnet 192.168.0.0 by adjusting the source address field for packets sent by mDNS client device 108 that are destined for the 192.168.0.0 subnet. For example, NAT gateway 106 will remove the mDNS client device 108 address (192.168.1.10) and replace it with its own address (192.168.0.20) in the source address field. Likewise, for returning packets, NAT gateway 106 will remove its own address (192.168.0.20) and replace it with the mDNS client device 108 address (192.168.1.10) in the destination address field. Using this method, NAT gateway 106 helps facilitate communication between all devices on home network 100.

Discussion will now be turned to mDNS characteristics of mDNS client device 108 and mDNS server 104. In one embodiment, mDNS server 104 is a printer that provides plug-and-play network printing services via Apple's™ Bonjour™ protocol, which relies on the multicast Domain Name System (mDNS). mDNS provides a mechanism whereby a device requesting services may send a query message that compels devices offering their services to reply with a corresponding response message. For example, mDNS client device 108 may send an mDNS query message to a group destination address requesting services. The group destination address indicates that the message should be forwarded to all devices within the subnet, and the address may be 224.0.0.251 in the case of IPv4 and FF02::FB in the case of IPv6. Upon receiving the mDNS query message requesting services, mDNS server 104 may advertise itself by sending a corresponding message (e.g. mDNS response message) having its own address as the source address and the group address as the destination address. Any device receiving such an mDNS response message may store the source address of the mDNS server 104 along with an indication of the service that is offered. A key constraint of the Bonjour™ protocol over mDNS is that query and response messages have a time to live (TTL) of 1; therefore, network routers and gateways cannot forward these messages, so they will only be circulated around the subnetwork (subnet) on which they originated. One purpose of this constraint is to avoid overwhelming adjacent subnets with excessive mDNS messages in situations where there are many services being offered and requested. However, a downside of this constraint is that clients may not be able to access a desirable service on another subnet.

Figure 1B:
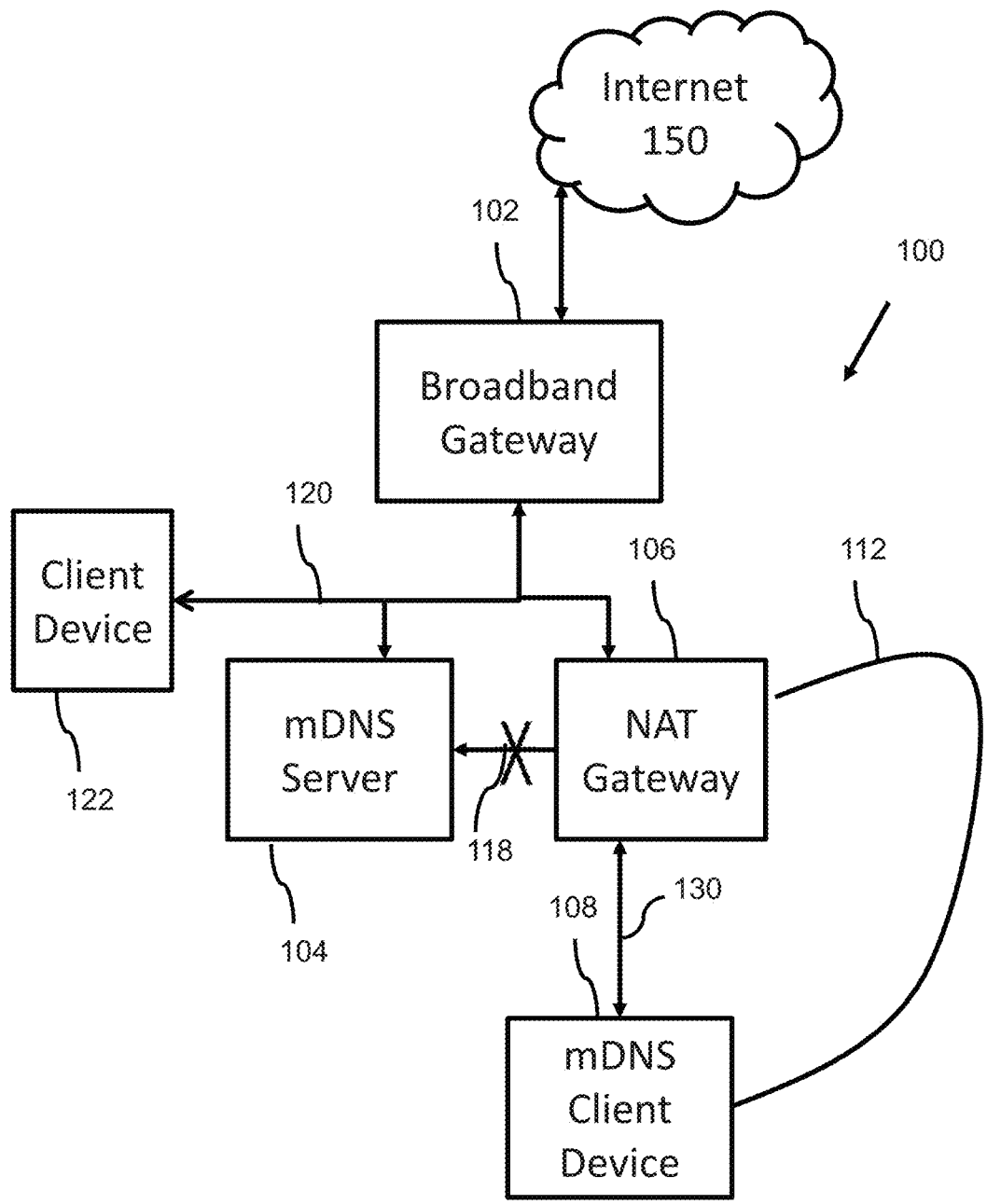
FIG. 1B shows an example of mDNS in a conventional network.

FIG. 1B depicts how a conventional home network 100 fails to connect mDNS client device 108 with services offered by mDNS server 104 under provisions of the Bonjour™ protocol using mDNS. As outlined above in FIG. 1A, when mDNS client device 108 wants to request availability of print services, it will send an mDNS query message with its own address as the source address and a group address as the destination address, such as group address 224.0.0.251. Since the mDNS query message has a TTL of 1, and a source address of 192.168.1.10, only devices in the 192.168.1.0 subnet will receive this message, and NAT gateway 106 will not forward the message to mDNS server 104 on subnet 192.168.0.0. As shown by the failed connection 118, mDNS client device 108 has no way to reach mDNS server 104 for print services.

Figure 2A:
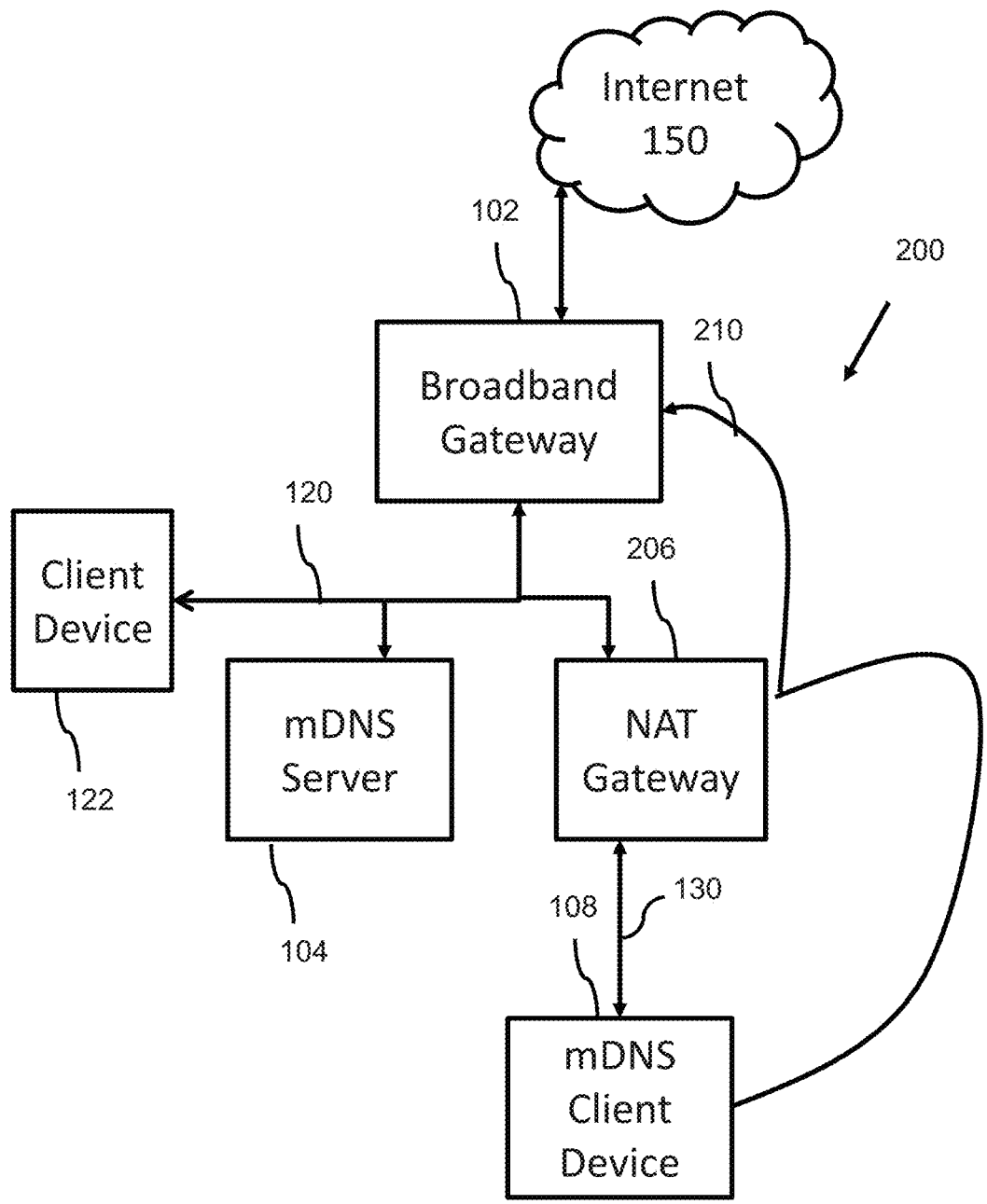
FIG. 2A shows a home network with a NAT gateway in accordance with one or more embodiments.

FIG. 2A depicts home network 200 having NAT gateway 206 in accordance with one or more embodiments.

NAT gateway 206 may be any device or system that is configures to allow data to flow from one discrete network to another, which as will be described in greater detail below, will be from a wireless local area network (WLAN) to another network. NAT gateway 206 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

NAT gateway 206 may include a processor and a memory. In some embodiments, at least one of the processor and the memory may be implemented as any combination of an apparatus, a system and an integrated circuit. Further, in some cases, the processor may be implemented as a computer having a non-transitory computer-readable recording medium. A non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules maybe located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, the memory of NAT gateway 206 can store various programming, and user content, and data. In example embodiments, as will be described in greater detail below, the memory includes onboarding instructions to instruct the processor to enable NAT gateway 206 to: receive an mDNS query from mDNS client device 108, the mDNS query including a first internet protocol (IP) address associated with mDNS client device 108 and a payload; substitute, in the mDNS query, the first IP address with a second IP address associated with NAT gateway 206 to generate a modified mDNS query including the second IP address and the payload; and relay the modified mDNS query to mDNS server 104.

In some embodiments, as will be described in greater detail below, the memory includes onboarding instructions to further instruct the processor to enable NAT gateway 206 to: receive an mDNS response from mDNS server 104, in response to the modified mDNS query and addressed to mDNS client device 108, the mDNS response including a third IP address associated with mDNS server 104; substitute, in the mDNS response, the third IP address with a fourth IP address associated with said gateway device to generate a modified mDNS response including the fourth IP address; and relay the modified mDNS response to mDNS client device 108. In some of these embodiments, as will be described in greater detail below, the memory includes onboarding instructions to further instruct the processor to enable NAT gateway 206 to maintain a data structure that maps the first IP address with the second IP address, that maps the third IP address with the fourth IP address and that maps ports associated with the first sub-network with ports associated with the second sub-network so as to enable a transmission control protocol (TCP) session between mDNS client device 108 and mDNS server 104. In some other of these embodiments, as will be described in greater detail below, the memory includes onboarding instructions to further instruct the processor to enable NAT gateway 206 to accept a first transmission control protocol (TCP) connection from mDNS client device 108; initiate a second TCP connection with mDNS server 104; and pass TCP data from mDNS client device 108 to mDNS server 104.

Devices in FIG. 2A may have the same network address as described in FIG. 1A. In some embodiments, NAT gateway 206 provides a solution to the aforementioned problem by looking for Bonjour™ mDNS packets and forwarding them to adjacent subnets regardless of TTL and source address. NAT gateway 206 may do this by specifically looking for TCP/UDP ports, source/destination addresses, header information, and/or payload data indicating that a packet is a Bonjour™ mDNS packet. Upon receiving a packet containing an mDNS query message and correctly identifying it as such, NAT gateway 206 may then replace the source address of the mDNS query message with its own source address (192.168.0.20). In this way, devices in adjacent subnets that would not ordinarily receive the mDNS request message will now be able to receive it.

Figure 2B:
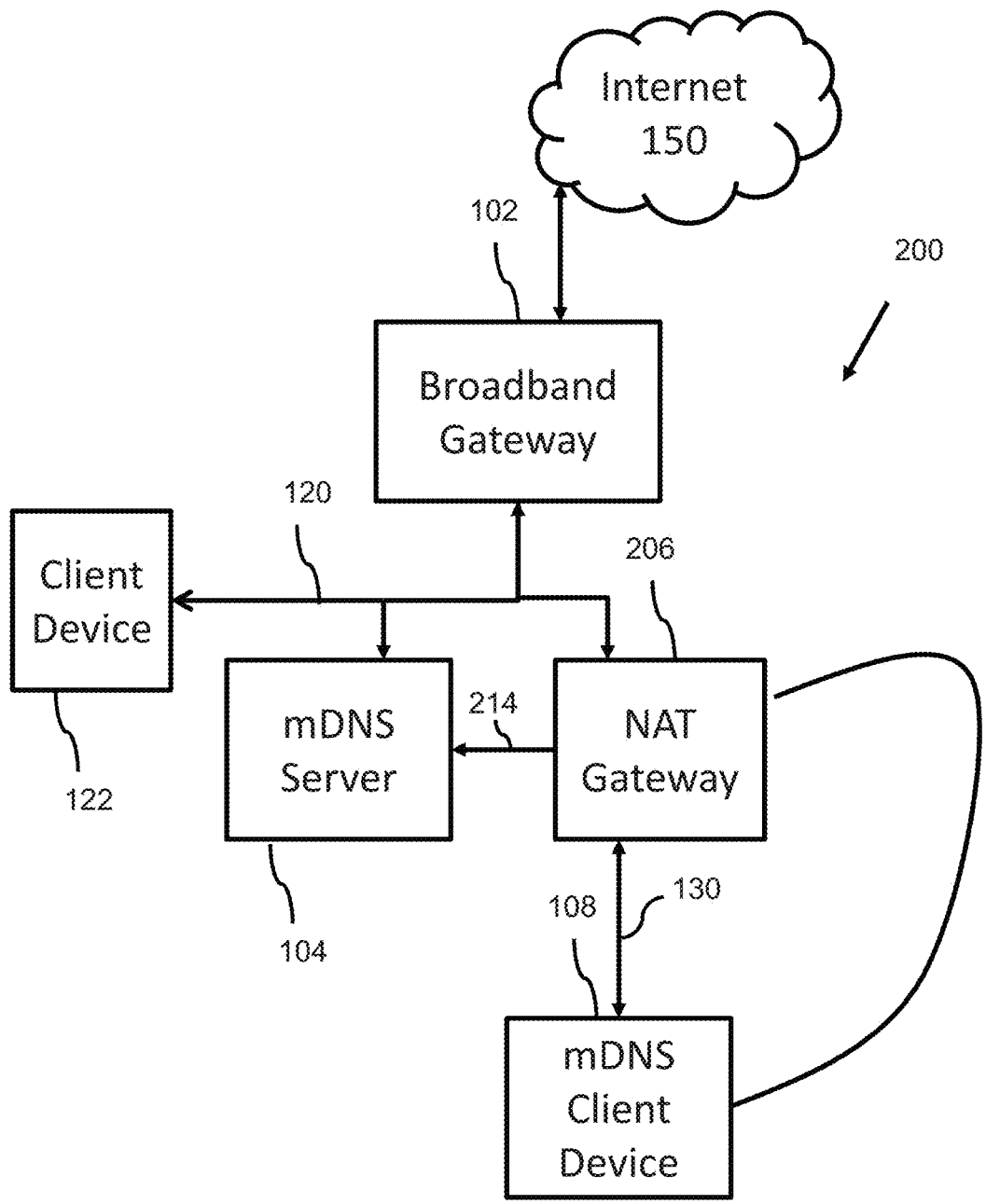
FIG. 2B shows mDNS in a home network with a NAT gateway in accordance with one or more embodiments.

FIG. 2B depicts how NAT gateway 206 in home network 200 is able to successfully connect mDNS client device 108 with services offered by mDNS server 104. In order to locate print services, mDNS client device 108 may send a Bonjour™ mDNS query message to the group destination address requesting print services. Upon receiving the packet containing the mDNS query message from mDNS client device 108, NAT gateway 206 then replaces the source address of the mDNS query message (192.168.1.10) with its own source address (192.168.0.20) and then forwards the packet on the 192.168.0.0 subnet. Connection 214 shows the successfully transmission of this message. Upon receiving the mDNS query message requesting services, mDNS server 104 may advertise itself by sending a corresponding message (e.g. mDNS response message) having its own address as the source address and the group address as the destination address. Now, upon receiving the mDNS query response message, NAT gateway 206 then replaces the destination address with the mDNS client device 108 address (192.168.1.10) and forwards the message on the 192.168.1.0 network. mDNS client device 108 then stores the source address of the mDNS server 104 along with an indication of the service that is offered. Finally, mDNS client device 108 may then initiate a TCP session with the mDNS server 104 in order to execute a print request, with the NAT gateway 206 providing network address translation throughout the duration of the connection. Alternatively, in a TCP proxy mode, NAT gateway 206 may accept the connection request from mDNS client device 108 directly, and then initiate its own connection to the mDNS server 104 in order to pass TCP data between the two connections transparently.

Figure 3A:
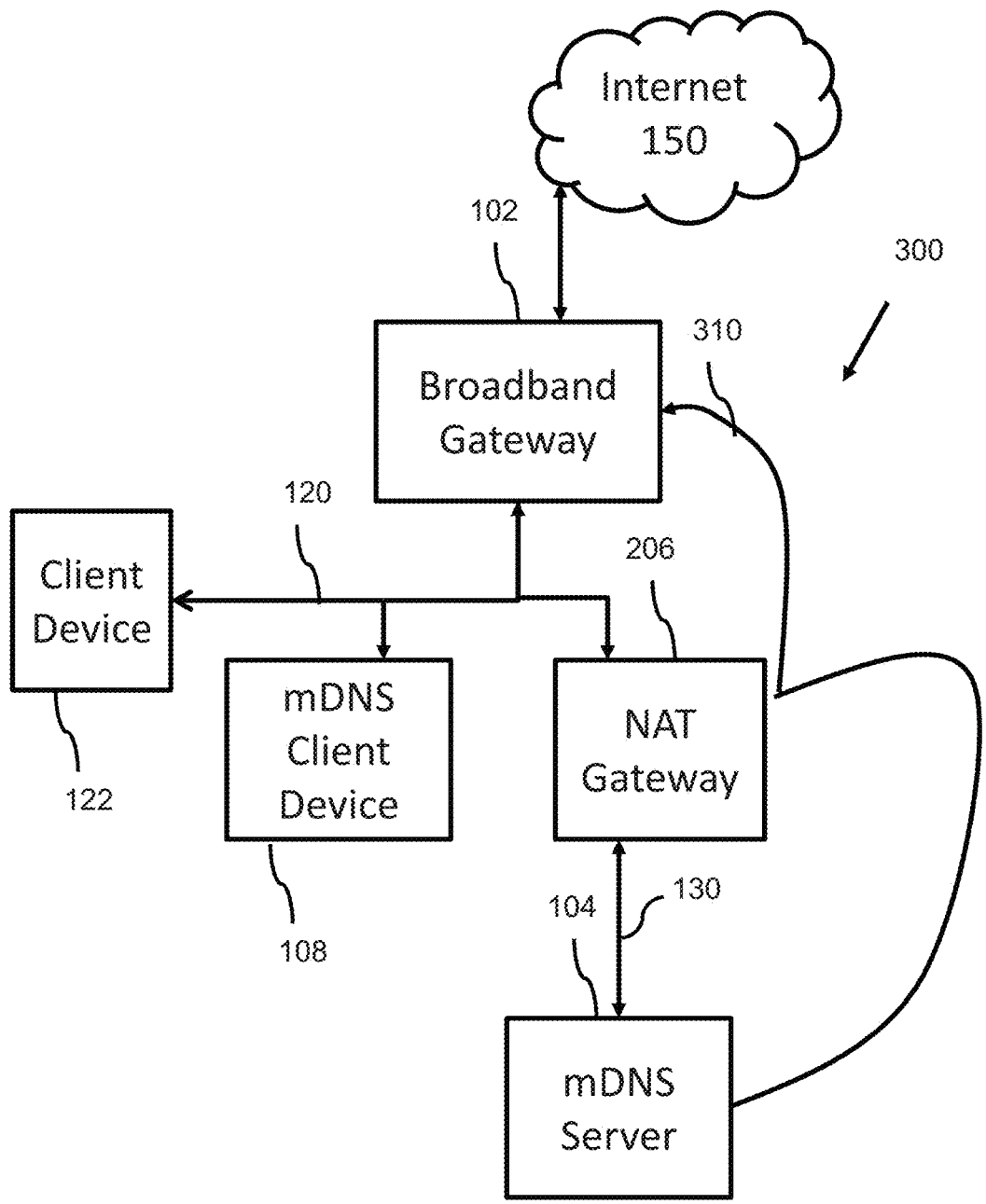
FIG. 3A shows an example NAT gateway as depicted in FIG. 2A, but with a different arrangement of the home network.

FIG. 3A depicts home network 200 having NAT gateway 206 in accordance with one or more embodiments, and with an arrangement where mDNS client device 108 and mDNS server 104 have switched places and addresses. Devices in FIG. 3A may have the same network address as described in FIG. 1A, except that mDNS client device 108 has address 192.168.0.30 and mDNS server 104 has address 192.168.1.10. In some embodiments, NAT gateway 206 provides a solution to aforementioned mDNS problems by looking for Bonjour™ mDNS packets and forwarding them to adjacent subnets regardless of TTL and source address. Upon receiving a packet containing an mDNS query message and correctly identifying it as such, NAT gateway 206 may then replace the source address of the mDNS query message with its own source address (192.168.1.254) on the appropriate subnet (192.168.1.0). In this way, devices in adjacent subnets that would not ordinarily receive the mDNS request message will now be able to receive it.

Figure 3B:
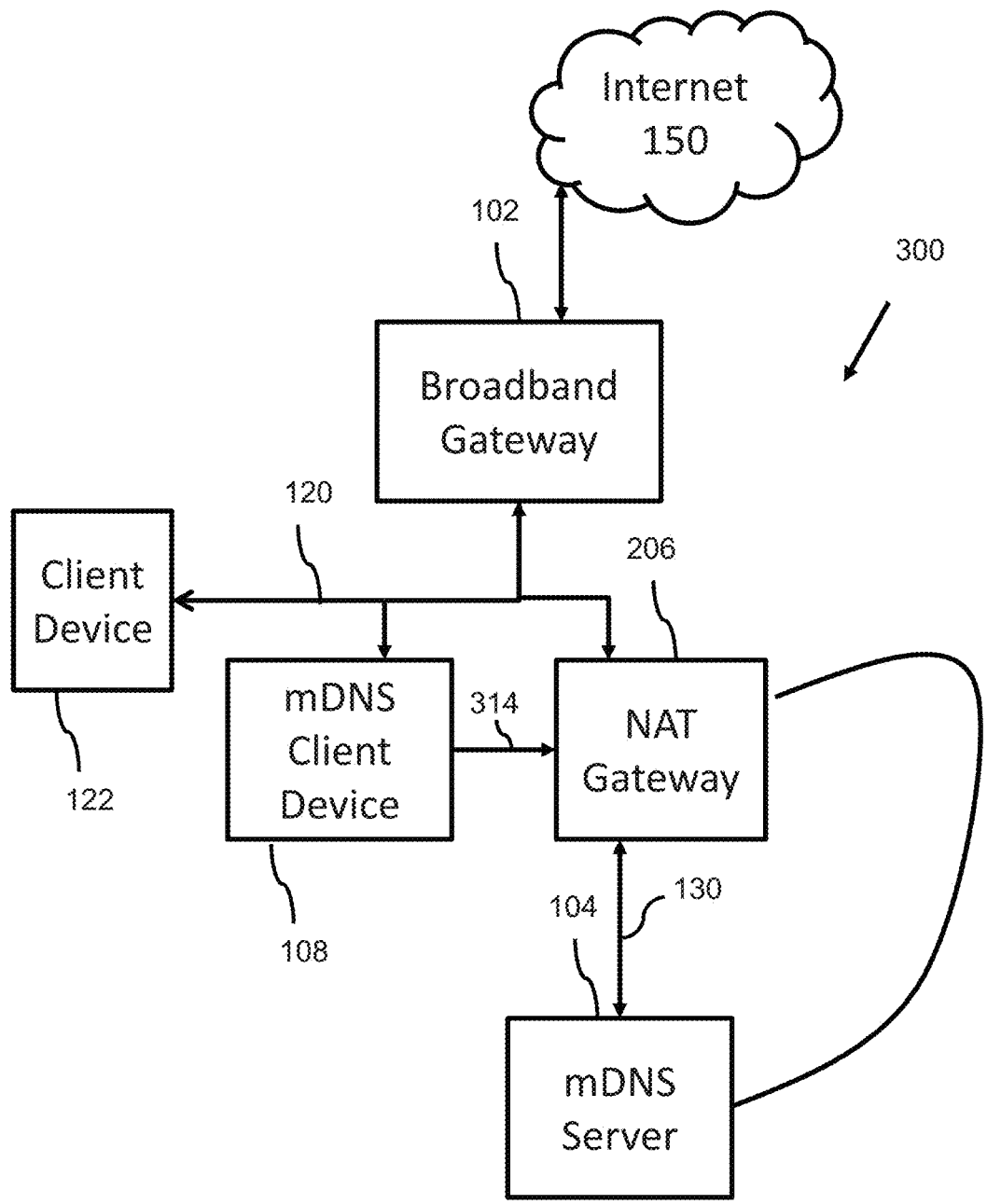
FIG. 3B shows mDNS with a NAT gateway using the home network arrangement of FIG. 3A.

FIG. 3B depicts how NAT gateway 206 in home network 200 is able to successfully connect mDNS client device 108 with services offered by mDNS server 104, and with an arrangement where mDNS client device 108 and mDNS server 104 have switched places and addresses. Devices in FIG. 3B may have the same network address as described in FIG. 3A. In order to locate print services, mDNS client device 108 may send a Bonjour™ mDNS query message to the group destination address requesting print services. Upon receiving the packet containing the mDNS query message from mDNS client device 108, NAT gateway 206 then replaces the source address of the mDNS query message (192.168.0.30) with its own source address (192.168.1.254) and then forwards the packet on the 192.168.1.0 subnet. Connection 314 shows the successfully transmission of this message. Upon receiving the mDNS query message requesting services, mDNS server 104 may advertise itself by sending a corresponding message (e.g. mDNS response message) having its own address as the source address and the group address as the destination address. Now, upon receiving the mDNS query response message, NAT gateway 206 then replaces the destination address with the mDNS client device 108 address (192.168.0.30) and forwards the message on the 192.168.0.0 network. mDNS client device 108 then stores the source address of the mDNS server 104 along with an indication of the service that is offered. Finally, mDNS client device 108 may then initiate a TCP session with the mDNS server 104 in order to execute a print request, with the NAT gateway 206 providing network address translation throughout the duration of the connection. Alternatively, in a TCP proxy mode, NAT gateway 206 may accept the connection request from mDNS client device 108 directly, and then initiate its own connection to the mDNS server 104 in order to pass TCP data between the two connections transparently.

FIG. 4A shows a port mapping table 400 for NAT gateway 206 in accordance with some embodiments of the invention. Columns in port mapping table 400 refer to the NAT-enabled side 402 and the mDNS side 404. Further, rows in table 400 refer to Local IP 406, Remote IP 408, Local Port 410, and Remote Port 412. NAT gateway 206 assembles the values in port mapping table 400 by following mDNS query and response messages while they traverse between subnets, as discussed above. By maintaining port mapping table 400, NAT gateway 206 is able to ensure accurate deliver of all Bonjour™ mDNS messages on home network 100.

Figure 4B:
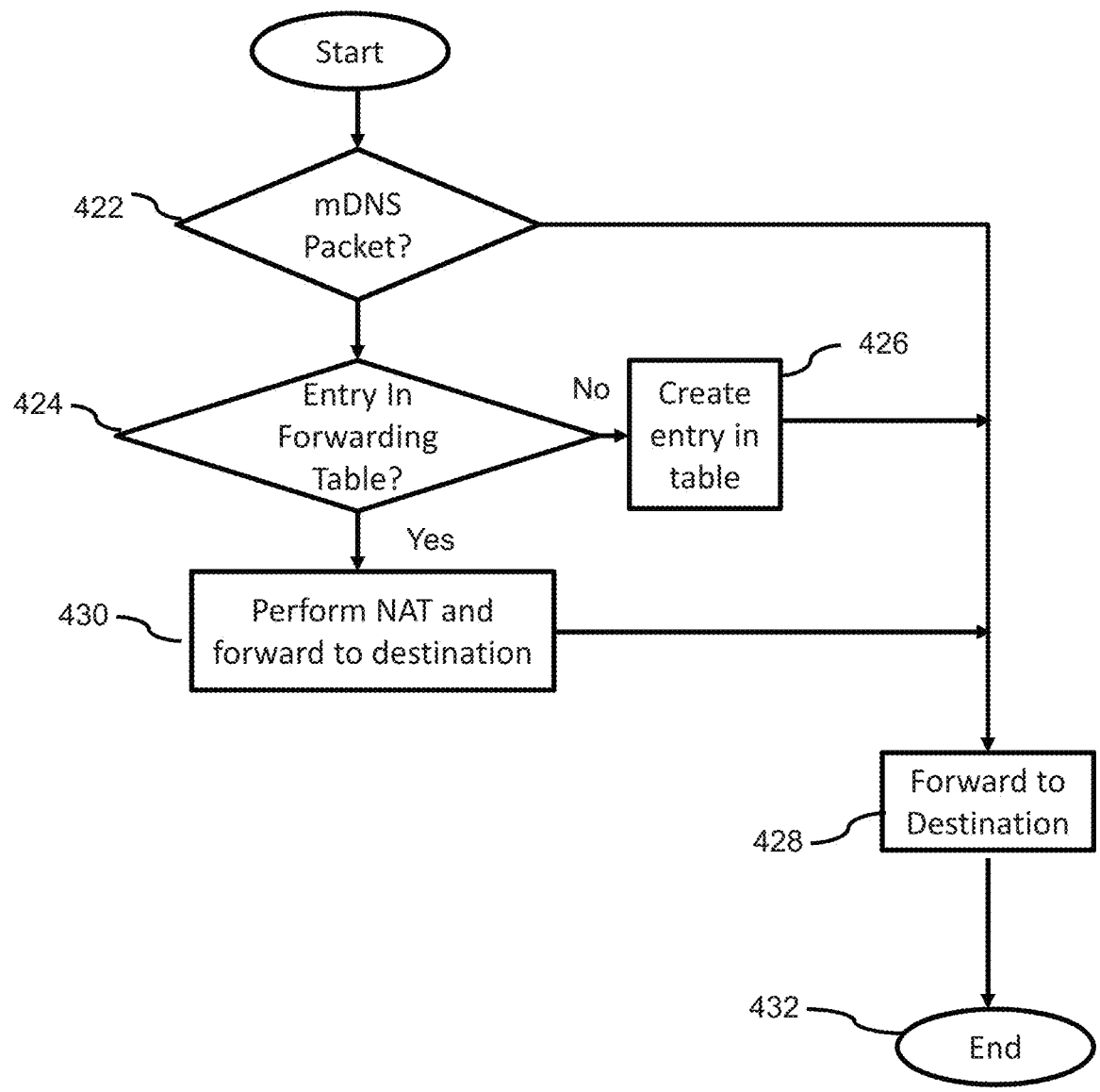
FIG. 4B shows an algorithm to be executed by a processor within a NAT gateway in accordance with some embodiments of the invention.

FIG. 4B shows an algorithm 420 to be executed by a processor within NAT gateway forwarding method in accordance with some embodiments of the invention.

As shown in the figure, algorithm 420 starts and it is determined whether a received packet is an mDNS packet. For example, as shown in FIG. 2A, NAT gateway 206 may receive a packet from client device 122 or from mDNS server 104 via LAN 120 or may receive a packet from mDNS client device 108 via LAN 130. NAT gateway 206 may determine from the header in the packet as to whether the received packet is an mDNS packet.

Returning to FIG. 4B, if it is determined that the received packet is not an mDNS packet (No at S422), then the packet is forwarded to its destination (S428). For example, as shown in FIG. 2A if either one of client device 122 or mDNS server sends a packet to NAT gateway 206, then NAT gateway 206 will forward the packet to its destination. Returning to FIG. 4B, after the packet is forwarded to its destination (S428), algorithm 420 ends (S432).

Alternatively, if it is determined that the received packet is an mDNS packet (Yes at S422), then it is determined whether there is an entry in the forwarding table (S424). For example, if the received packet is a mDNS packet then NAT gateway 206 will check its forwarding table to determine whether an entry exists for this specific sender.

If it is determined that there is an entry in the forwarding table (Yes at S424), then network address translation is performed according to the address and ports in the forwarding table and the packet is forwarded to its destination (S430). For example, NAT gateway 206 may translate the network address to the address of mDNS server 104 and modify the ports based on the information in the forwarding table as shown in FIG. 4A. As shown in FIG. 2B, NAT gateway 206 will then forward the packet to mDNS server 104. Returning to FIG. 4B, after the packet is forwarded to its destination (S430), algorithm 420 ends (S432).

Further, if it is determined that there is not an entry in the forwarding table (No at S424), then an entry for this sender is made in the forwarding table (S426). For example, NAT gateway 206 may modify the forwarding table as shown in FIG. 4A so as to include the information related to the sender.

After an entry for the sender is made in the forwarding table (S426), then network address translation is performed according to the address and ports in the table and the packet is forwarded to its destination (S430), wherein algorithm 420 then ends (S432).

Figure 5:
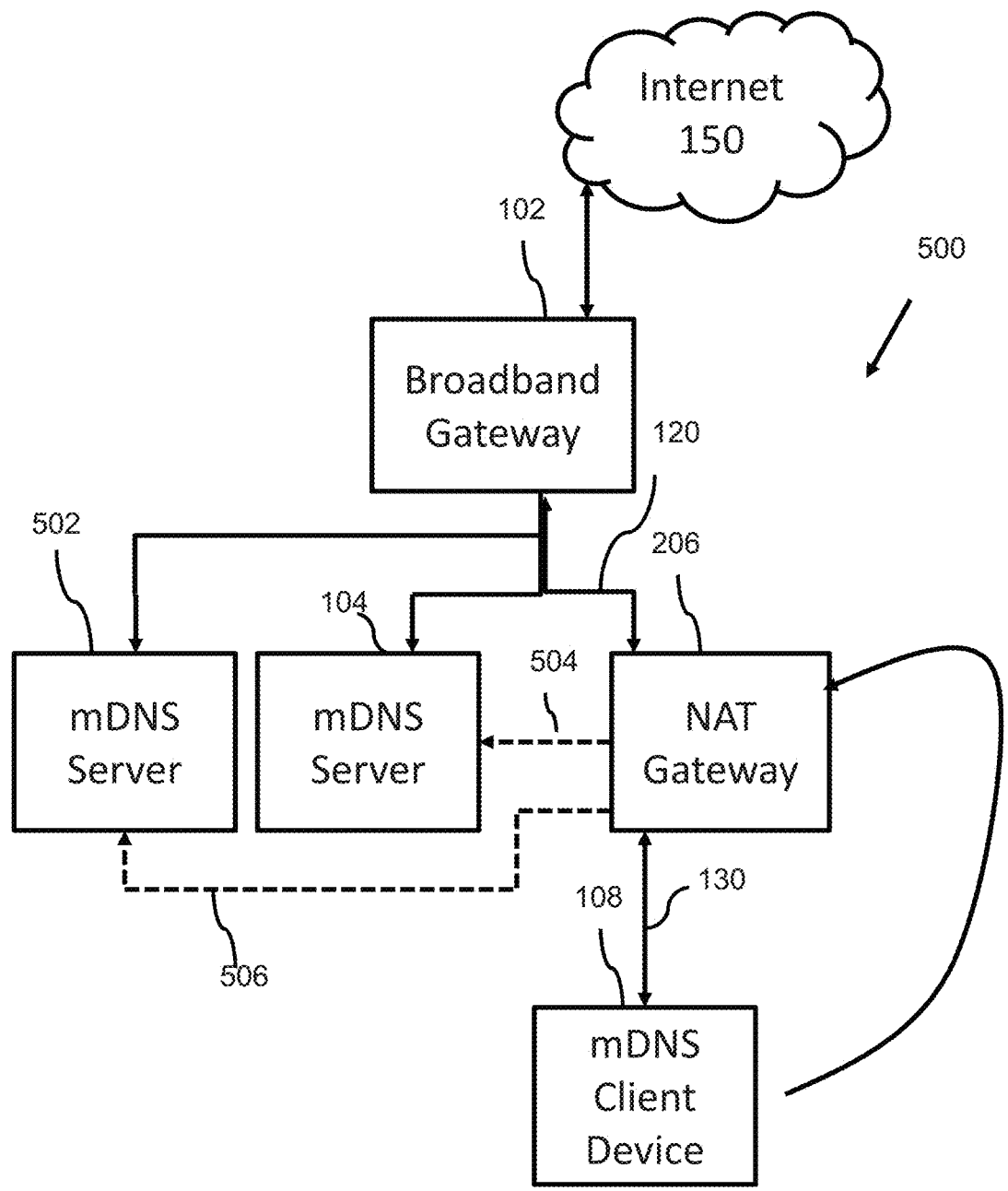
FIG. 5 shows a home network with a NAT gateway supporting multiple servers in accordance with one or more embodiments.

FIG. 5 shows a home network with a NAT gateway 206 supporting multiple servers in accordance with one or more embodiments. Devices in FIG. 5 may have the same network address as described in FIG. 1A, with the exception that mDNS server 502 may have the address 192.168.0.31 on subnet 192.168.0.0. mDNS server 502 may constitute a second identical print server to mDNS server 104 or may provide different features and/or implement a different protocol. Additionally, rather than replace the source address with its own address during address translation, NAT gateway 206 may preemptively reserve unique addresses to be used exclusively for mDNS server 104 and mDNS server 502. For example, on the 192.168.1.0 subnet, rather than using its own address (192.168.1.254) when performing network address translation, NAT gateway 206 may use address 192.168.1.252 for mDNS server 104 and the address 192.168.1.253 for mDNS server 502. Upon receiving a packet containing an mDNS response message and correctly identifying it as such, NAT gateway 206 may then replace the source address of the mDNS response message with 192.168.1.252 for mDNS server 104 and 192.168.1.253 for mDNS server 502.

Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

What is claimed is:

1. A network translation address (NAT) gateway device comprising:
    a memory; and
    a processor configured to execute instructions stored on the memory to cause the NAT gateway device to:
        receive a multicast domain name system (mDNS) query from an mDNS client requesting a service from a mDNS server, the mDNS query including a first source internet protocol (IP) address associated with the mDNS client, a group destination IP address, and a payload, wherein the NAT gateway device connects to the mDNS client on a first sub-network and the mDNS server on a second sub-network, wherein the NAT gateway device connects the mDNS server indirectly to the mDNS client, and wherein the NAT gateway device provides a relay for the mDNS client on the first sub-network through the second sub-network to a broadband gateway;
        substitute, in the mDNS query, the first source IP address associated with the mDNS client with a second source IP address associated with the NAT gateway device to generate a modified mDNS query;
        relay, on the second sub-network, the modified mDNS query to the group destination IP address including a first destination IP address associated with the mDNS server, wherein the group destination IP address indicates that the modified mDNS message should be forwarded to all devices within the second sub-network, and wherein the modified mDNS message compels all devices within the second sub-network offering services to reply with a corresponding response message;
        receive an mDNS response from the mDNS server, in response to the modified mDNS query, having a second destination IP address associated with the NAT gateway device, the mDNS response having a third source IP address associated with the mDNS server;
substitute, in the mDNS response, the second destination IP address associated with the NAT gateway device with a third destination IP address associated with the mDNS client to generate a modified mDNS response, wherein the NAT gateway stores the third source IP address associated with the mDNS server and an indication of the service offered by the mDNS server;
relay the modified mDNS response to the third destination IP address associated with the mDNS client;
accept, in a TCP proxy mode, a first transmission control protocol (TCP) connection directly from the mDNS client;
initiate, in the TCP proxy mode, a TCP connection with the mDNS server; and
pass, in the TCP proxy mode, TCP data from the mDNS client to the mDNS server.

2. The NAT gateway device of claim 1, wherein the processor is further configured to cause the NAT gateway device to:
substitute, in the mDNS response, the third source IP address associated with the mDNS server with a fourth source IP address associated with the NAT gateway device.

3. The NAT gateway device of claim 2, wherein the processor is further configured to execute instructions stored on the memory to cause the NAT gateway device to maintain a data structure that maps the first source IP address with the second source IP address, that maps the third source IP address with the fourth source IP address, that maps the second destination IP address with the third destination address, and that maps ports associated with the first sub-network with ports associated with the second sub-network so as to enable a subsequent transmission control protocol (TCP) session between the mDNS client and the mDNS server.

4. The NAT gateway device of claim 1, wherein the processor is further configured to cause the NAT gateway device to:
receive a second mDNS response from a second mDNS server, in response to the modified mDNS query having a fifth source IP address associated with the second mDNS server and the second destination IP address associated with the NAT gateway device;
substitute, in the second mDNS response, the fifth source IP address associated with the second mDNS server with the fourth source IP address associated with the NAT gateway device, and the second destination IP address associated with the gateway device with the third destination IP address associated with the mDNS client to generate a second modified mDNS response; and
relay the second modified mDNS response to the third destination IP address associated with the mDNS client.

5. The NAT gateway device of claim 4, wherein the second source IP address and fourth source IP address are selected from one or more available IP addresses that are reserved exclusively for mDNS communication.

6. The NAT gateway device of claim 1, wherein the mDNS query contains information indicating that it is an mDNS query.

7. The NAT gateway device of claim 6, wherein the information is a TCP and/or user datagram protocol (UDP) port number.

8. A method of operating a network translation address (NAT) gateway device, the method comprising:
receiving, via a processor configured to execute instructions stored on a memory, a multicast domain name system (mDNS) query from an mDNS client requesting a service from a mDNS server, the mDNS query including a first source internet protocol (IP) address associated with the mDNS client, a group destination IP address, and a payload, wherein the NAT gateway device connects to the mDNS client on a first sub-network and the mDNS server on a second sub-network, wherein the NAT gateway device connects the mDNS server indirectly to the mDNS client, and wherein the NAT gateway device provides a relay for the mDNS client device on the first sub-network through the second sub-network to a broadband gateway;
substituting, via the processor and in the mDNS query, the first source IP address associated with the mDNS client with a second source IP address associated with the NAT gateway device to generate a modified mDNS query;
relaying, via the processor, on the second sub-network, the modified mDNS query to the group destination IP address including a first destination IP address associated with the mDNS server, wherein the group destination IP address indicates that the modified mDNS message should be forwarded to all devices within the second sub-network, and wherein the modified mDNS message compels all devices within the second sub-network offering services to reply with a corresponding response message;
receiving an mDNS response from the mDNS server, in response to the modified mDNS query, having a second destination IP address associated with the NAT gateway device, the mDNS response having a third source IP address associated with the mDNS server;
substituting, in the mDNS response, the second destination IP address associated with the NAT gateway device with a third destination IP address associated with the mDNS client to generate a modified mDNS response, wherein the NAT gateway stores the third source IP address associated with the mDNS server and an indication of the service offered by the mDNS server;
relaying the modified mDNS response to the third destination IP address associated with the mDNS client;
accepting, in a TCP proxy mode, a first transmission control protocol (TCP) connection directly from the mDNS client;
initiating, in the TCP proxy mode, a TCP connection with the mDNS server; and
passing, in the TCP proxy mode, TCP data from the mDNS client to the mDNS server.

9. The method of claim 8, further comprising:
substituting, via the processor and in the mDNS response, the third source IP address associated with the mDNS server with a fourth source IP address associated with the NAT gateway device.

10. The method of claim 9, further comprising maintaining, via the processor, a data structure that maps the first source IP address with the second source IP address, that maps the third source IP address with the fourth source IP address, that maps the second destination IP address with the third destination address, and that maps ports associated with the first sub-network with ports associated with the second sub-network so as to enable a transmission control protocol (TCP) session between the mDNS client and the mDNS server.

11. The method of claim 8, further comprising:
receiving, via the processor, a second mDNS response from a second mDNS server, in response to the modified mDNS query having a fifth source IP address associated with the second mDNS server and the second destination IP address associated with the NAT gateway device;
substituting, via the processor, in the second mDNS response, the fifth source IP address associated with the second mDNS server with a fourth source IP address associated with the NAT gateway device, and the second destination IP address associated with the NAT gateway device with the third destination IP address associated with the mDNS client to generate a second modified mDNS response; and
relaying, via the processor, the second modified mDNS response to the third destination IP address associated with the mDNS client.

12. The method of claim 11, wherein the second source IP address and fourth source IP address are selected from one or more available IP addresses that are reserved exclusively for mDNS communication.

13. The method of claim 8, wherein the mDNS query contains information indicating that it is an mDNS query.

14. The method of claim 13, wherein the information is a TCP and/or user datagram protocol (UDP) port number.

15. A non-transitory, computer-readable media having computer-readable instructions stored thereon, the computer-readable instructions are read by a network translation address (NAT) gateway device, wherein the computer-readable instructions are instructing the NAT gateway device to perform a method comprising:
receiving, via a processor of the NAT gateway device, an mDNS query from an multicast domain name system (mDNS) client requesting a service from an mDNS server, the mDNS query including a first source internet protocol (IP) address associated with the mDNS client, a group destination IP address, and a payload, wherein the NAT gateway device connects to the mDNS client on a first sub-network and the mDNS server on a second sub-network, wherein the NAT gateway device connects the mDNS server indirectly to the mDNS client, and wherein the NAT gateway device provides a relay for the mDNS client device on the first sub-network through the second sub-network to a broadband gateway;
substituting, via the processor and in the mDNS query, the first source IP address associated with the mDNS client with a second source IP address associated with the NAT gateway device to generate a modified mDNS query;
relaying, via the processor, on the second sub-network, the modified mDNS query to the group destination IP address including a first destination IP address associated with the mDNS server, wherein the group destination IP address indicates that the modified mDNS message should be forwarded to all devices within the second sub-network, and wherein the modified mDNS message compels all devices within the second sub-network offering services to reply with a corresponding response message;
receiving an mDNS response from the mDNS server, in response to the modified mDNS query, having a second destination IP address associated with the NAT gateway device, the mDNS response having a third source IP address associated with the mDNS server;
substituting, in the mDNS response, the second destination IP address associated with the NAT gateway device with a third destination IP address associated with the mDNS client to generate a modified mDNS response, wherein the NAT gateway stores the third source IP address associated with the mDNS server and an indication of the service offered by the mDNS server;
relaying the modified mDNS response to the third destination IP address associated with the mDNS client;
accepting, in a TCP proxy mode, a first transmission control protocol (TCP) connection directly from the mDNS client;
initiating, in the TCP proxy mode, a TCP connection with the mDNS server; and
passing, in the TCP proxy mode, TCP data from the mDNS client to the mDNS server.

16. The non-transitory, computer-readable media of claim 15, wherein the computer-readable instructions are instructing the NAT gateway device to perform the method further comprising:
substituting, via the processor and in the mDNS response, the third source IP address associated with the mDNS server with a fourth source IP address associated with the NAT gateway device.

17. The non-transitory, computer-readable media of claim 16, wherein the computer-readable instructions are instructing the NAT gateway device to perform the method further comprising maintaining, via the processor, a data structure that maps the first source IP address with the second source IP address, that maps the third source IP address with the fourth source IP address, that maps the second destination IP address with the third destination address, and that maps ports associated with the first sub-network with ports associated with the second sub-network so as to enable a transmission control protocol (TCP) session between the mDNS client and the mDNS server.

18. The non-transitory, computer-readable media of claim 15, wherein the computer-readable instructions are instructing the NAT gateway device to perform the method further comprising:
receiving, via the processor, a second mDNS response from a second mDNS server, in response to the modified mDNS query having a fifth source IP address associated with the second mDNS server and the second destination IP address associated with the NAT gateway device;
substituting, via the processor, in the second mDNS response, the fifth source IP address associated with the second mDNS server with the fourth source IP address associated with the NAT gateway device, and the second destination IP address associated with the gateway with the third destination IP address associated with the mDNS client to generate a second modified mDNS response; and
relaying, via the processor, the second modified mDNS response to the third destination IP address associated with the mDNS client.

19. The non-transitory, computer-readable media of claim 18, wherein the computer-readable instructions are instructing the NAT gateway device to perform the method wherein the second source IP address and fourth source IP address are selected from one or more available IP addresses that are reserved exclusively for mDNS communication.

20. The non-transitory, computer-readable media of claim 15, wherein the computer-readable instructions are instructing the NAT gateway device to perform the method wherein the mDNS query contains information indicating that it is an mDNS query.

21. The non-transitory, computer-readable media of claim 20, wherein the computer-readable instructions are instructing the NAT gateway device to perform the method wherein the information is a TCP and/or user datagram protocol (UDP) port number.

* * * * *